United States Patent [19]
Yu et al.

[11] Patent Number: 5,814,706
[45] Date of Patent: Sep. 29, 1998

[54] POLYMERIC DISPERSANTS VIA NOVEL TERPOLYMERS

[75] Inventors: Daniel Y. F. Yu, Columbus, Ind.; Carl A. Mike, Chesterfield, Va.

[73] Assignee: Ethyl Corporation, Richmond, Va.

[21] Appl. No.: 997,347

[22] Filed: Dec. 23, 1997

Related U.S. Application Data

[62] Division of Ser. No. 748,881, Nov. 14, 1996, Pat. No. 5,733,993.

[51] Int. Cl.$^6$ ........................................... C08F 8/32
[52] U.S. Cl. ..................... 525/327.6; 525/327.4; 525/327.7; 525/327.8; 525/329.6; 525/329.9; 525/330.1; 525/330.2; 525/370; 525/371; 525/374; 525/379; 525/380; 525/382; 525/384
[58] Field of Search ........................ 525/327.4, 327.6, 525/327.7, 327.8, 329.6, 329.9, 330.1, 330.2, 370, 371, 374, 379, 380, 382, 384

[56] References Cited

U.S. PATENT DOCUMENTS

| | | |
|---|---|---|
| 3,393,168 | 7/1968 | Johnson . |
| 3,404,135 | 10/1968 | Tietz . |
| 3,720,637 | 3/1973 | Bacskai . |
| 3,845,159 | 10/1974 | Takeshita . |
| 3,849,517 | 11/1974 | Takeshita . |
| 3,852,249 | 12/1974 | Miyabe et al. . |
| 4,234,435 | 11/1980 | Meinhardt et al. ................. 252/51.5 A |
| 5,068,490 | 11/1991 | Eaton ........................ 585/525 |
| 5,080,815 | 1/1992 | Fenoglio et al. ................... 252/51.5 A |
| 5,112,507 | 5/1992 | Harrison ........................ 252/51.5 A |
| 5,175,225 | 12/1992 | Ruhe, Jr. . |
| 5,336,727 | 8/1994 | Okazawa et al. . |
| 5,356,552 | 10/1994 | Harrison et al. ................... 252/51.5 A |

FOREIGN PATENT DOCUMENTS

| | | |
|---|---|---|
| 657475 | 6/1995 | European Pat. Off. . |
| 1 087 075 | 10/1967 | United Kingdom . |
| 1 087 297 | 10/1967 | United Kingdom . |
| 1 128 304 | 9/1968 | United Kingdom . |
| 95/07944 | 3/1995 | WIPO . |

*Primary Examiner*—Jeffrey T. Smith
*Assistant Examiner*—N. Sarofim
*Attorney, Agent, or Firm*—Dennis H. Rainear; Thomas Hamilton

[57] ABSTRACT

Novel terpolymers are disclosed which comprise the reaction product of a high molecular weight olefin, such as polybutene or polypropylene, with an unsaturated acid reactant, such as maleic anhydride and a di-or polyunsaturated reactant. The terpolymers are useful as dispersants in lubricating oils and fuels and are also used to prepared polysuccinimides and other post-treated additives useful in lubricating oils and fuels.

14 Claims, No Drawings

POLYMERIC DISPERSANTS VIA NOVEL TERPOLYMERS

This is a divisional of application Ser. No. 08/748,881 filed on Nov. 14, 1996, Pat. No. 5,733,993.

TECHNICAL FIELD

This invention is directed to novel compositions useful as lubricant additives which comprise terpolymers of a high molecular weight olefin, an unsaturated acidic monomer and a di- or polyunsaturated reactant. The terpolymers of the present invention are useful as starting materials for the preparation of dispersants used in lubricating oil compositions or as dispersants themselves. The dispersants of the present invention also advantageously impart fluidity modifying properties to lubricating oil compositions which are sufficient to allow elimination of some proportion of the viscosity index improver from the lubricating oil compositions which contain these dispersants.

BACKGROUND

Chemical additives for lubricating oils are used to control the physical and chemical properties of the oils. These additives are used to modify oil viscosity and viscosity index, to make the oils more resistant to oxidation, and to keep engines and other mechanical equipment clean and protected against corrosion and wear, and keep particulate matter dispersed to minimize or eliminate sludge and deposits.

Hydrocarbon-based chemical additives are designed for specific functions by choosing a hydrocarbon type and molecular weight range or molecular weight distribution to allow the additives to function in the fluid type of interest. For instance, high molecular weight polymers can be used to increase viscosity and viscosity index of mineral oils or synthetic oils. Polar head groups can be designed to be attached to low or high molecular weight hydrocarbon tails to achieve detergency, dispersancy, antiwear or anticorrosion performance.

Alkenyl-substituted succinic anhydrides have been used as dispersants. Such alkenylsubstituted succinic anhydrides have been prepared by two different processes, a thermal process, referred to herein as "ene chemistry" (see, e.g., U.S. Pat. No. 3,361,673) and a chlorination process (see, e.g., U.S. Pat. No. 3,172,892). The polyisobutenyl succinic anhydride ("PIBSA") produced by the thermal process has been characterized to contain a double bond in the product. The chlorination process PIBSA's have been characterized as monomers containing either a double bond, a ring, other than a succinic anhydride ring and/or chlorine in the product. See J. Weill and B. Sillion, "Reaction of Chlorinated Polyisobutene with Maleic Anhydride:Mechanism Catalysis by Dichloromaleic Anhydride", Revue de l'Institut Francais du Petrole, Vol. 40, No. 1, pp. 7789 (January–February, 1985). Such compositions include one-to-one monomeric adducts (see, e.g., U.S. Pat. Nos. 3,219,666; 3,381,022) as well as adducts having polyalkenyl derived substituents adducted with at least 1.3 succinic groups per polyalkenyl derived substituent (see, e.g., U.S. Pat. No. 4,234,435 to Meinhardt). PIBSA serves as a ubiquitous precursor to several commercial crankcase ashless dispersants, including succinimides, succinates, succinate esters, and triazoles. In the formation of succinimides, the PIBSA is reacted with a polyamine to form a structurally complex mixture which can contain imide, amide, imidazoline and diamide groups.

U.S. Pat. No. 5,112,507 discloses a copolymer of an unsaturated acidic reactant and a high molecular weight alkylvinylidene olefin having a sufficient number of carbon atoms such that the resulting copolymer is soluble in lubricating oil and wherein the olefin has at least about one branch per two carbon atoms along the chain.

U.S. Pat. No. 4,873,009 discloses a lube oil dispersant obtained by reacting a $C_8$ to $C_{500}$ polybutene succinic acid or anhydride compound and a hydroxypropylated alkylene diamine, the diamine being the reaction product of propylene oxide and an alkylene diamine. This patent also discloses that the dispersant contains boron at a level which improves the compatibility of the dispersant toward fluorocarbon engine seals.

U.S. Pat. No. 5,080,815 discloses a dispersant composition comprising the reaction product obtained by reacting a $C_{30}$ to $C_{250}$ hydrocarbyl-substituted succinic anhydride with aminoguanidine.

European Patent Application No. 0 657 475 discloses copolymers of unsaturated acidic reactants and high molecular weight olefins as useful dispersants in lubricating oils. The ratio of anhydride groups to the hydrocarbon groups in these copolymers is disclosed as being at least 1.3.

PCT Application No. 95/07944 discloses copolymers comprising monoethylenically unsaturated dicarboxylic acids, oligomers of propene or of a branched chain olefin of 4 to 10 carbon atoms having a molecular weight of from 300 to 5,000, and at least one monoethylenically unsaturated compound which is copolymerizable with the dicarboxylic acid component and propene oligomer component. This patent application discloses the use of the polymers as additives for lubricants and fuels.

U.S. Pat. No. 4,234,435 discloses the use of carboxylic acid acylating agents which are derived from polyalkenes such as polybutenes and a dibasic carboxylic reactant such as maleic or fumaric acid. The acylating agents are further characterized by the presence, within their structure, of at least 1.3 groups derived from a dibasic carboxylic reactant for each equivalent weight of the polyalkene. The acylating agents are then further reacted with polyamines or polyols to produce derivatives that are useful as lubricant additives or as intermediates to be subjected to post treatment with various other chemical compounds.

U.S. Pat. No. 5,356,552 discloses a lubricating oil composition which comprises a minor amount of a polyamino alkenyl or alkyl succinimide wherein the succinimide comprises the reaction product of 1) an alkenyl or alkyl substituted succinic anhydride derived from a polyolefin having an average molecular weight of from 2,000 to 2,700 and a polyalkylene polyamine having an average nitrogen atom to molecule ratio of greater than 4.0 and wherein the reaction product is post treated with a cyclic carbonate.

U.S. Pat. No. 5,454,962 discloses a dispersing agent made by reacting aminoguanidine with a hydrocarbyl-substituted succinic acid or anhydride in a mole ratio of from about 0.4 to about 1.2 moles of the aminoguanidine per mole of the succinic acid compound.

Multigrade lubricating oils must simultaneously meet both low and high temperature viscometric requirements. The high temperature requirement insures the lubricating oil maintains sufficient protective thickness during engine operation, while the low temperature requirement insures oil pumpability in cold climates. Multigrade lubricating oils are typically designated as follows: 5W30, 10W30, 15W40, etc. The first number in the sequence is associated with the low temperature viscosity requirement as measured by a cold crank simulator (CCS) at high shear, while the second number is associated with the high temperature viscosity requirement (typically the 100° C. kinematic viscosity). ASTM requirements establish the viscosity limits for specific multigrades oils (e. g. a 5W30 oil requires a −25° C. CCS of <3500 cP and a 100° C. viscosity of 9.5 to 12.4 cSt.)

The dual temperature viscometric requirements for multigrade motor oils presents a major challenge to oil formulators. Formulators utilize viscosity index improvers to address multigrade oil specifications. Conventional viscosity index improvers are oil soluble high molecular weight polymers that afford significant Kinematic viscosity increase to base oils. Viscosity index improvers contribute more to the high temperature viscosity of base oils than to the low temperature viscosity of base oils. Solution properties of high molecular weight polymers tend to afford lower viscosities in high shear environments.

The base oils utilized for lubricating compositions have characteristic natural viscosities. While blending base oils of different natural viscosities may meet the high temperature viscosity limits for a mutigrade oil, the resulting blend may exceed the required low temperature viscosity. A balance of viscosity index improver and base oil is often employed to achieve a desired multigrade oil.

The balance of bases oil and viscosity index improver can present limitations. Incorporation of higher amounts of viscosity index improver into lubricating oils to address high temperature requirements, can result in exceeding the low temperature requirement. While the use of a lower natural viscosity base oil can improve the low temperature viscometrics, the lower natural viscosity base oils can result in performance debits. Lower natural viscosity base oils are not as effective in diesel engines and are more prone to volatilization.

The dispersant additives incorporated into lubricating compositions to maintain engine cleanliness and prevent harmful deposits often have an antagonistic effect on the viscometric requirements of multigrade oils. The typical dispersants treat rates required to provide adequate dispersancy increase both the low and high temperature viscosities of base oils. Generally, the dispersants have a more pronounced effect on the low temperature viscosity than on the high temperature viscosity, which can result in an increased low temperature viscosity which exceeds or approaches the required limit. Formulation of multigrade motor oils becomes increasingly more difficult with this inherent dispersant antagonistic low temperature viscometric effect. A delicate balance of viscosity index improver and increasing proportions of undesirable low natural viscosity base oils is often required to address both the low and high temperature viscometric requirements of motor oils. The polymeric dispersants of the current invention impart excellent blending versatility to lubricating oils. The polymeric dispersants of the current invention afford excellent low temperature viscometrics while permitting the use of advantageous higher natural viscosity base oils. Thus, the polymeric dispersants of the present invention facilitate the formulation of multigrade oils versus conventional dispersants.

The prior art fails to suggest or disclose the novel terpolymer of the present invention which comprise a high molecular weight polyolefin, an unsaturated acidic reactant, and a diene. The material of this invention are thus an improvement over conventional dispersants because of their effectiveness as dispersants in the Sequence VE engine test coupled with their demonstrated enhanced blending versatility. The terpolymers of this invention are distinctive in that they incorporate a di- or polyunsaturated monomer which serves to inhibit the formation of gels and avoids the use of troublesome solvents in the preparation of the polymeric dispersants of this invention.

SUMMARY OF THE INVENTION

In general, the present invention is directed to novel compositions useful as intermediates for lube oil and fuel additives which comprise terpolymers of a high molecular weight olefin, an unsaturated acidic reactant and a di- or polyunsaturated reactant ("diene reactant"). Another aspect of the present invention is directed to the functionalization of the terpolymers into novel crankcase and fuel additives. There is disclosed a terpolymer comprising an unsaturated acidic reactant, a high molecular weight olefin and a diene reactant wherein the high molecular weight olefin has a sufficient number of carbon atoms such that the resulting terpolymer is soluble in lubricating oil.

There is further disclosed a polysuccinimide prepared by reacting the terpolymer of this invention with a polyamine having at least one basic nitrogen atom.

The invention further relates to a post-treated product prepared by a process which comprises reacting the polysuccinimide prepared in accordance with the invention with a post-treating agent selected from the group consisting of inorganic or organic phosphorus compounds, boron compounds, mono- or polycarboxylic acids and derivatives thereof.

The high molecular weight olefin has a sufficient number of carbon atoms so as to result in a terpolymer which is soluble in lubricating oil and is derived from the oligomerization or polymerization of $C_2$ to $C_{10}$ alpha olefin monomers. Suitable olefins include those having about 25 carbon atoms or more, preferably having about 60 carbon atoms or more. The preferred high molecular weight olefins include polybutene and polypropylene having a number average molecular weight of from about 300 to about 6,000 and wherein a majority of the high molecular weight olefin has polymer chains containing terminal vinylidene unsaturation. The high molecular weight olefins with terminal vinylidene unsaturation are represented in the following general formula: Poly-C(R)=$CH_2$ where R is an alkyl group of 1 to 6 carbons. Thus, a majority of the high molecular weight polymers have polymer chains ending in a divalent methylene group (=$CH_2$). Polybutenes having a number average molecular weight from about 800 to 5,000 are especially preferred in preparation of the terpolymers of this invention. As noted, the high molecular weight polyolefins to be used in this invention must contain at least 50 mole % of terminal vinylidene radicals of the formula (—C(R)=$CH_2$. The preferred polybutenes utilized in this invention contain more preferably at least 65 mole % vinylidene terminated polymers. Such high molecular weight polyolefins are commercially available and include high reactivity polyisobutylene (HR PIB) which can be prepared by the process taught in U.S. Pat. No. 5,068,490, the disclosure of which is incorporated herein by reference.

The unsaturated acidic reactant useful in the preparation of the copolymers of the present invention comprises at least one unsaturated $C_4$ to $C_{10}$ dicarboxylic acid, for example maleic or fumaric acid or anhydride or acid derivative selected from the group consisting of acid chloride, acid bromide, and lower alkyl acid derivatives. The unsaturated acidic reactant preferably comprises a maleic or fumaric reactant of the general formula:

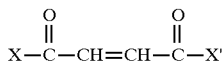

wherein X and X' are the same or different, provided that at least one of X and X' is a group that is capable of reacting to esterify alcohols, form amides or amine salts with ammonia or amines, form metal salts with reactive metals or basically reacting metal compounds and otherwise function to acylate. Typically, X and/or X' is OH, O hydrocarbyl, OM<+> where M<+> represents one equivalent of a metal, ammonium or amine cation, $NH_2$, Cl, Br, and taken together X and X' can be O so as to form an anhydride. Preferably, X and X' are such that both carboxylic functions can enter into acylation reactions. Preferred are acidic reactants where X and X' are each independently selected from the group consisting of OH, Cl, O lower alkyl and when taken together, X and X' are O. Other suitable acidic reactants include electron deficient olefins such as monophenyl maleic anhydride; monomethyl, dimethyl, monochloro, monobromo, monofluoro, dichloro and difluoro maleic anhydride; N-phenyl maleimide and other substituted maleimides; isomaleimides; fumaric acid, fumaric anhydride, maleic acid, alkyl hydrogen maleates and fumarates, dialkyl fumarates and maleates, fumaronilic acids and maleanic acids; and maleonitrile, and fumaronitrile. Preferred unsaturated acidic reactants include maleic anhydride and maleic acid. The particularly preferred acidic reactant is maleic anhydride.

The third component of the terpolymer of this invention is the di- or polyunsaturated reactant ("diene reactant"). Suitable di- or polyunsaturated reactants of the present invention include dienes, polyenes, di- or polyethylenically unsaturated ethers, esters, amines, amides, or other amine derivatives. Suitable dienes and polyenes contain 4 to 30 carbon atoms, and include but are not limited to hexadiene, octadiene, decadiene, dodecadiene, divinyl benzene, trivinylcyclohexane and mixtures thereof. Suitable di- or polyethylenically unsaturated ethers include divinyl ethers, diallyl ethers, ethylene glycol divinyl ether, diethylene glycol divinyl ether, etc. Suitable di- or polyethylenically unsaturated esters include acrylate or methacrylate esters derived from diols or polyols, such as pentaerythritol diacrylate, pentaerythritol triacrylate, pentaerythritol tetraacrylate, ethylene glycol dimethacrylate, diethylene glycol dimethacrylate, etc. Suitable di- or polyethylenically unsaturated amines and amine derivatives include diallylamine, triallylamine, diallylformamide, and diallyldimethylammonium chloride. Suitable di- or polyethylenically unsaturated acrylamides include those derived from di- or polyamines, such as methylene bisacrylamide, N,N'-ethylenebisacrylamide. Additional suitable monomers include esters derived from functionalization of di- or polycarboxylic acids with unsaturated alcohols and or unsaturated amines, such as diallyl maleate, diallyl succinate, triallyl 1,3,5-benzenetricarboxylate.

The formamides useful in the present invention have the chemical structure:

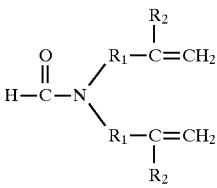

wherein each $R_1$ is independently an alkyl radical of 1 to 5 carbon atoms and each $R_2$ may independently be hydrogen or an alkyl radical of 1 to 3 carbon atoms.

The terpolymers of this invention may contain from 20 to 80 mole percent of the unsaturated acidic reactant, from 10 to 70 mole percent of the high molecular weight olefin and 0.5 to 20 mole percent of the diene reactant.

The terpolymers of the present invention may be prepared by known conventional polymerization processes; for example, by mass, emulsion, suspension, precipitation and solution polymerizations. The polymerizations are preferably carried out in a nitrogen atmosphere. Conventional apparatuses, for example autoclaves and kettles, can be used for the polymerization.

The exact polymerization conditions should be chosen to achieve the desired final molecular weight of the resulting terpolymer. Polymerizations at high temperatures typically result in terpolymers having a relatively low molecular weight while lower polymerization temperatures result in higher molecular weight terpolymers. The terpolymer free radical reactions may be conducted at a temperature of about 30° C. to about 210° C., preferably from about 40° C. to about 150° C.

The polymerization reaction may be conducted neat, that is, the high molecular weight olefin, unsaturated acidic reactant, diene reactant, and a free radical initiator, if used, are combined in the proper ratio, and then stirred at the reaction temperature. Alternatively, the reaction may be conducted in a diluent. For example, the reactants may be combined in a solvent. Suitable solvents include those in which the reactants and free radical initiator are miscible and include acetone, tetrahydrofuran, chloroform, methylene chloride, dichloroethane, toluene, dioxane, chlorobenzene, xylenes, and the like. After the reaction is complete, volatile components may be stripped off. When a diluent is employed, it is preferably inert to the reactants and products formed and is generally used in an amount sufficient to ensure efficient stirring.

In general, the polymerizations can be initiated by any free radical initiator. Such initiators are well known in the art. However, the choice of free-radical initiator may be influenced by the reaction temperature employed. The preferred free-radical initiators are the peroxide-type polymerization initiators and the azotype polymerization initiators. Radiation can also be used to initiate the reaction, if desired.

The peroxide-type free-radical initiator can be organic or inorganic, the organic having the general formula: $R_3OOR_3'$ where $R_3$ is any organic radical and $R_3'$ is selected from the group consisting of hydrogen and any organic radical. $R_3$ and $R_3'$ are organic radicals, preferably hydrocarbon, aroyl, and acyl radicals, carrying, if desired, substituents such as halogens, etc. Preferred peroxides include di-tert-butyl peroxide, tert-butyl peroxybenzoate, and dicumyl peroxide. Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azotype compounds, typified by 1,1'-azobisisobutyronitrile, are also well known free radical promoting materials. These azo compounds can be defined as those having present in the molecule group N=N wherein the valances are satisfied by organic radicals, at least one of which is preferably attached to a tertiary carbon. Other suitable azo compounds include, but are not limited to, p-bromobenzenediazonium fluoroborate; p-tolyldiazoaminobenzene; p-bromobenzenediazonium hydroxide; azomethane and phenyldiazonium halides. A suitable list of azotype compounds can be found in U.S. Pat. No. 2,551,813 to Pinkney.

The amount of initiator to employ, exclusive of radiation, of course, depends to a large extent on the particular initiator chosen, the high molecular olefin used and the reaction conditions. The initiator is preferably soluble in the reaction medium. The preferred concentrations of initiator are between 0.001:1 and 0.3:1 moles of initiator per mole of acidic reactant, with more preferred amounts being between 0.005:1 and 0.2:1.

The polymerization temperature must be sufficiently high to break down the initiator to produce the desired free radicals. For example, using benzoyl peroxide as the initiator, the reaction temperature can be between about 75° C. and about 90° C., preferably between about 80° C. and about 85° C. Higher and lower temperatures can be employed, a suitable broad range of temperatures being between about −30° C. and about 210° C., with preferred temperatures between about 70° C. and about 160° C. The reaction pressure should be sufficient to maintain the solvent in the liquid phase, but the preferred pressure is atmospheric. The reaction time is usually sufficient to result in the substantially complete conversion of the unsaturated acidic reactant, diene reactant, and high molecular weight olefin to terpolymer. The reaction time is suitable between one and 24 hours, with preferred reaction times between two and ten hours.

As noted above, when the subject reaction is a solution-type polymerization reaction the high molecular weight olefin, unsaturated acidic reactant, diene reactant, solvent and initiator can be brought together in any suitable manner. The reaction solvent, as noted above, must be one which dissolves both the acidic reactant and the high molecular weight olefin. It is necessary to dissolve the acidic reactant and high molecular weight olefin so as to bring them into intimate contact in the solution polymerization reaction. Suitable solvents include liquid saturated or aromatic hydrocarbons having from six to 20 carbon atoms; ketones having from three to six carbon atoms; and liquid saturated aliphatic dihalogenated hydrocarbons having from one to five carbon atoms per molecule, preferably from one to three carbon atoms per molecule.

The terpolymer is conveniently separated from solvent and unreacted acidic reactant by conventional procedures such as phase separation, solvent distillation, precipitation and the like. If desired, dispersing agents and/or cosolvents may be used during the reaction.

Those skilled in this art will also appreciate that the terpolymers according to the present invention may be prepared through the use of regulators such as 2-mercaptoethanol, chain extenders and other entities known to the art.

The terpolymers of the present invention have number average molecular weights in the range of from about 1,000 to about 100,000. These terpolymers are useful as dispersants themselves and also as intermediates in the preparation of other additives having improved dispersancy and/or detergency properties when employed in a lubricating oil.

The isolated terpolymer may be reacted with a nucleophilic agent to form advantageous fuel and lubricant additives, as described below. Suitable nucleophiles include amines, alcohols, metal reactants and mixtures thereof.

As to type, the dispersants of this invention made from the polybutene/maleic anhydride/diene terpolymers of the invention can be polymeric succinic ester-amide dispersants, polymeric succinimide dispersants, polymeric succinic amide-triazole dispersants, or polymeric succinic triazole dispersants. Process technology that can be adapted for producing these various types of dispersants can be found in the literature. The terpolymers of the invention can be converted into succinic ester-amide type dispersant using conditions such as are described in U.S. Pat. Nos. 3,219,666; 3,282,959; 3,640,904; 4,426,305 and 4,873,009; or into succinimide type dispersants using conditions such as are described in U.S. Pat. Nos. 3,172,892; 3,219,666; 3,272,746; or 4,234,435; or into succinic triazole dispersant or succinic amide-triazole dispersant (depending upon reaction proportions employed) using conditions such as are described in U.S. Pat. Nos. 4,908,145 and 5,080,815. The present invention is further directed to monosuccinimides (where a polyamine component reacts with one succinic group); bis-succinimides (where a polyamine component reacts with a succinic group from each of two terpolymer molecules, thus effectively cross-linking the polymer molecules); and higher succinimides (where a polyamine component reacts with a succinic group from each of greater than 2 terpolymer molecules). These succinimides are useful as dispersants and/or detergents in fuels and oils. In addition, these succinimides have advantageous viscosity modifying properties, and may provide a viscosity index credit when used in lubricating oils, which may permit elimination of some portion of a viscosity index improver from multigrade lubricating oils containing the same.

Accordingly, the present invention also relates to a lubricating oil composition comprising a major amount of an oil of lubricating viscosity and an amount of a terpolymer, polysuccinimide or modified succinimide additive of the present invention sufficient to provide dispersancy and/or detergency.

Another aspect of the present invention is a fuel composition comprising a major portion of a fuel boiling in a gasoline or diesel range and an amount of terpolymer, succinimide or modified succinimide additives sufficient to provide dispersancy and/or detergency. The present invention is also directed to fuel concentrates comprising an inert stable oleophilic organic solvent boiling in the range of about 150° F. to about 400° F. and from about 5 to 50 weight percent of an additive of the present invention.

The dispersants of this invention can be post-treated (i.e., reacted) with various post-treating agents such as are referred to in U.S. Pat. Nos. 4,234,435 and 5,137,980. Preferred post-treated dispersants of this invention are those which have been borated by reaction with a suitable boron-containing material, such as boric acid or other boron acids, boron oxide, boron trihalides, ammonium borate, super-borated ashless dispersants, etc. Generally speaking, the borated dispersants will contain from about 0.01 to about 1% by weight of boron and preferably from about 0.05 to about 0.5 weight % of boron based on the weight of the active dispersant (i.e., omitting from consideration the weight of any diluent or unreacted components that may be present in the dispersant).

Polyamines (including polyether polyamines) and polyhydroxy amines that can be used in forming the dispersants of this invention have at least one primary or secondary amino group in the molecule. Amines of this type and also polyols that can be used in forming ester-amide dispersants of this invention are extensively described in the patent literature, such as, for example U.S. Pat. Nos. 4,234,435, 4,873,009 and 5,137,980. The polyamine is preferably one or a mixture of polyamines which has at least one primary amino group in the molecule and which additionally contains an average of at least two other amino nitrogen atoms in the molecule.

One preferred type of polyamine is comprised of alkylene polyamines such as those represented by the formula:

$$H_2N(CH_2)_n(NH(CH_2)_n)_mNH_2$$

wherein n is 2 to about 10 (preferably 2 to 4, more preferably 2 or 3, and most preferably 2) and m is 0 to 10, (preferably 1 to about 6) and mixtures thereof. Preferably the polyalkylene amine contains from 3 to 6 primary amino groups. Cyclic polyamines such an aminoalkyl-piperazines, e.g. β-aminoethyl-piperazine, can also be used in the invention. Another preferred type of polyamine is comprised of hydrocarbyl polyamines containing from 10 to 50 weight percent acyclic alkylene polyamines and 50 to 90 weight percent cyclic alkylene polyamines.

In principle, any polyamine having at least one primary amino group and an average of at least three amino nitrogen atoms in the molecule can be used in forming the dispersants of this invention. Product mixtures known in the trade as "triethylene tetramine", "tetraethylene pentamine", and "pentaethylene hexamine" are most preferred. Such a polyamine may be alkoxylated e.g. by incorporation of 1 to 2 N-substituted $C_2$ or $C_3$ hydroxyalkyl groups per molecule, preferably β-hydroxyethyl groups.

Other polyamines can also be used in making the dispersants of the present invention, e.g. aminoguanidine and/ or a basic salt thereof, for example aminoguanidine bicarbonate as desired in U.S. Pat. No. 4,908,145.

When the terpolymers of this invention and the derivatives of the terpolymers of this invention are used in lubricating oils, they are typically present in from 0.1 to 20% by weight of the total composition. Preferably, they represent 0.5 to 15% by weight and still more preferably from about 1 to about 7% by weight. The lubricating oils that benefit from the additive compositions of this invention may be mineral oils or synthetic oils of lubricating viscosity which are suitable for use in the crank case of an internal combustion engine.

Lubricating oil concentrates are also included within the scope of this invention. The concentrates of this invention usually include from about 90 to 10 weight percent, preferably from about 90 to about 50 weight percent of an oil of lubricating viscosity and from about 10 to 90 weight percent, preferably from about 10 to about 50 weight percent of an additive of this invention. Other additives which may be present in the concentrate, include rust inhibitors, foam inhibitors, corrosion inhibitors, metal deactivators, pour point depressants, antioxidants and a variety of other well known additives.

The terpolymers of the present invention and their derivatives, are also useful as dispersants in fuels. The concentration of the additive in a fuel is dependent upon a variety of factors, including the type of fuel used, the presence of other detergents or dispersants or other additives, and the like. The additives are used in the fuel in any amount sufficient to provide the desired dispersancy, preferably the additive is used in an amount of from about 10 to 10,000 weight parts per million, more preferably from 30 to 5,000 parts per million. The additives of this invention may also be formulated as a fuel concentrate using an inert stable organic solvent for a diluent. Diluents such as benzene, toluene, xylene or higher boiling aromatics are representative of useful diluents.

The following Examples are offered to specifically illustrate this invention. These Examples and illustrations are not to be construed in any way as limiting the scope of this invention.

Preparation of Terpolymers

The terpolymers of this invention were characterized by infrared (IR) spectroscopy and acid number determinations. The terpolymers exhibit IR carbonyl absorbances at 1860±5 and 1770±5 wavenumbers.

The following procedure was utilized to determine the acid number values for the terpolymers. A known quantity of the terpolymer was dissolved in a 1:1 kerosene:1-butanol mixture and titrated with sodium isopropoxide titrant to its potentiometric endpoint. The Acid Number is calculated and divided by 56.1 to give an Acid Number in milliequivalents of KOH per gram of sample.

EXAMPLE 1

Terpolymer of Polybutene, Maleic Anhydride, and Diallylformamide

A 250 ml flask equipped with overhead stirrer, condenser, and thermocouple under a nitrogen atmosphere was charged with 55.8 g of liquid polybutene (Glissopal® 3251 from BASF). The polybutene had a number average molecular weight by gel permeation chromatography of 1000. The polybutene was unsaturated containing more than 75% terminal vinylidene groups. The polymer was heated with stirring under nitrogen to 150° C. A solution of 8.21 g of maleic anhydride in 50 ml of xylene (previously filtered to remove hydrolysis contaminants) was added cautiously to the heated polymer. After heating the resulting mixture to 145° C., the addition of 1.51 g of di-tert-butyl peroxide over about 4 hours was initiated. After about 15 minutes, 2.83 g of diallylformamide was added over about 3.75 hours to the heated polybutene/maleic anhydride/peroxide reaction mixture. The reaction temperature was maintained between 145°–147° C. during the peroxide/diallylformamide co-feed. The reaction temperature was then raised over 1 hour to 155° C. and held at this temperature for 1 hour. Solvent and residual maleic anhydride were removed in vacuo. A total of 67.00 g of product having an acid number of 1.08 milliequivalents (meq) of KOH/gram was recovered.

EXAMPLE 2

Terpolymer of Polybutene, Maleic Anhydride, and Diallylformamide

A 250 ml flask equipped with overhead stirrer, condenser, and thermocouple under a nitrogen atmosphere was charged with 56.71 g of liquid polybutene (Ultravis® 120 from BP). The polybutene had a number average molecular weight by gel permeation chromatography of 1778. The polybutene was unsaturated containing more than 65% terminal vinylidene groups. The polymer was heated with stirring under nitrogen to 150° C. A solution of 6.26 g of maleic anhydride in 37 ml of xylene (previously filtered to remove hydrolysis contaminants) was added cautiously to the heated polymer. After heating the resulting mixture to 145° C., 1.53 g of di-tert-butyl peroxide and 2.15 g of diallylformamide were added over about 3 hours. The reaction temperature was maintained between 145°–147° C. during the peroxide/ diallylformamide co-feed. The reaction temperature was then raised over 1 hour to 155° C. and held at this temperature for 1 hour. Solvent and residual maleic anhydride were removed in vacuo. A total of 64.74 g of product having an acid number of 0.36 milliequivalents (meq) of KOH/gram was recovered.

EXAMPLE 3

Terpolymer of Polybutene, Maleic Anhydride, and 1,9-Decadiene

A 2 L flask equipped with overhead stirrer, condenser, and thermocouple under a nitrogen atmosphere was charged with 500 g of liquid polybutene (Glissopal® 3251 from BASF). The polybutene had a number average molecular weight by gel permeation chromatography of 1000. The polybutene was unsaturated containing more than 75% terminal vinylidene groups. The polymer was heated with stirring under nitrogen to 150° C. A solution of 98.33 g of maleic anhydride in 275 ml of xylene (previously filtered to remove hydrolysis contaminants) was added cautiously to the heated polymer. After heating the resulting mixture to 145° C., 10.57 g of di-tert-butyl peroxide and 7.39 g of 1,9-decadiene were added over about 2.25 hours. The reaction temperature was maintained between 145°–147° C. during the peroxide/1,9-decadiene co-feed. The reaction temperature was then raised over 1 hour to 155° C. and held at this temperature for 1 hour. Solvent and residual maleic anhydride were removed in vacuo. A total of 614.9 g of product having an acid number of 1.38 milliequivalents (meq) of KOH/gram was recovered.

EXAMPLE 4

Terpolymer of Polybutene, Maleic Anhydride, and 1,9-Decadiene

A 2 L flask equipped with overhead stirrer, condenser, and thermocouple under a nitrogen atmosphere was charged with 752.20 g of liquid polybutene (Ultravis® 120 from BP). The polybutene had a number average molecular weight by gel permeation chromatography of 1778. The polybutene was unsaturated containing more than 65% terminal vinylidene groups. The polymer was heated with stirring under nitrogen to 150° C. A solution of 87.17 g of maleic anhydride in 245 ml of xylene (previously filtered to remove hydrolysis contaminants) was added cautiously to the heated polymer. After heating the resulting mixture to 145° C., 10.06 g of di-tert-butyl peroxide and 6.15 g of 1,9-decadiene were added over about 2.5 hours. The reaction temperature was maintained between 145°–147° C. during the peroxide/1,9-decadiene co-feed. The reaction temperature was then raised over 1 hour to 155° C. and held at this temperature for 1 hour. Solvent and residual maleic anhydride were removed in vacuo. A total of 856.2 g of product having an acid number of 0.75 milliequivalents (meq) of KOH/gram was recovered.

EXAMPLE 5

Terpolymer of Polybutene, Maleic Anhydride, and Divinylbenzene

A 250 ml flask equipped with overhead stirrer, condenser, and thermocouple under a nitrogen atmosphere was charged with 100.0 g of liquid polybutene (Glissopal® 3251 from BASF). The polybutene had a number average molecular weight by gel permeation chromatography of 1000. The polybutene was unsaturated containing more than 75% terminal vinylidene groups. The polymer was heated with stirring under nitrogen to 150° C. A solution of 24.57 g of maleic anhydride in 67 ml of xylene (previously filtered to remove hydrolysis contaminants) was added cautiously to the heated polymer. After heating the resulting mixture to 145° C., 1.00 g of di-tert-butyl peroxide was added over about 1 hour. To the resulting mixture, 1.19 g of di-tert-butyl peroxide and 1.23 g of divinylbenzene were added over about 1 hour. The reaction temperature was maintained between 145°–147° C. during the peroxide/divinylbenzene co-feed. The reaction temperature was then raised over 1 hour to 155° C. and held at this temperature for 1 hour. Solvent and residual maleic anhydride were removed in vacuo. A total of 122.15 g of product having an acid number of 1.44 milliequivalents (meq) of KOH/gram was recovered.

EXAMPLE 6

Terpolymer of Polybutene, Maleic Anhydride, and Divinylbenzene

A 250 ml flask equipped with overhead stirrer, condenser, and thermocouple under a nitrogen atmosphere was charged with 130.01 g of liquid polybutene (Ultravis® 30 from BP). The polybutene had a number average molecular weight by gel permeation chromatography of 1300. The polybutene was unsaturated containing more than 65% terminal vinylidene groups. The polymer was heated with stirring under nitrogen to 150° C. A solution of 24.62 g of maleic anhydride in 62 ml of xylene (previously filtered to remove hydrolysis contaminants) was added cautiously to the heated polymer. After heating the resulting mixture to 145° C., 1.00 g of di-tert-butyl peroxide was added over about 1 hour. To the resulting mixture, 1.04 g of di-tert-butyl peroxide and 1.16 g of divinylbenzene were added over about 2 hours. The reaction temperature was maintained between 145°–147° C. during the peroxide/divinylbenzene co-feed. The reaction temperature was then raised over 1 hour to 155° C. and held at this temperature for 1 hour. Solvent and residual maleic anhydride were removed in vacuo. A total of 153.99 g of product having an acid number of 1.16 milliequivalents (meq) of KOH/gram was recovered.

Reaction of Terpolymers with Amines

The Terpolymer/Amine products were characterized by Infrared Spectroscopy. These products exhibit infrared carbonyl absorbances at 1770±5 and 1700±5 wavenumbers ($cm^{-1}$).

EXAMPLE 7

Succinimide from the Terpolymer of Example 1

A 250 ml flask equipped with overhead stirrer, Dean Stark trap, and thermometer was charged with 25.01 g of terpolymer of Example 1 (Acid # 1.08 meq KOH/g) and 35.38 g of process oil. The mixture was heated to 115° C. with stirring under a continual nitrogen purge. A polyethylene amine mixture comparable to tetraethylenepentamine (Dow® S-1107), 3.24 g was added to the above mixture over about 10 minutes. The reaction temperature was then raised to and held at 155° C. for 3 hours. Residual water was removed in vacuo to afford 61.85 g of product (including process oil).

EXAMPLE 8

Succinimide from the Terpolymer of Example 3

A 1 L resin kettle equipped with overhead stirrer, Dean Stark trap, and thermometer was charged with 104.39 g of terpolymer of Example 3 (Acid # 1.38 meq KOH/g) and 153.32 g of process oil. The mixture was heated to 115° C. with stirring under a continual nitrogen purge. A polyethylene amine mixture comparable to tetraethylenepentamine, (Dow® S 1107), 17.58 g, was added to the above mixture over about 10 minutes. The reaction temperature was then raised to and held at 155° C. for 3 hours. Residual water was removed in vacuo to afford 271.0 g of product (including process oil).

EXAMPLE 9

Succinimide from Terpolymer of Example 4

A 1 L resin kettle equipped with overhead stirrer, Dean Stark trap, and thermometer was charged with 101.07 g of terpolymer of Example 4 (Acid # 0.75 meq KOH/g) and 168.49 g of process oil. The mixture was heated to 115° C. with stirring under a continual nitrogen purge. A polyethylene amine mixture comparable to tetraethylenepentamine, (Dow® S 1107), 9.3 g, were added to the above mixture over about 10 minutes. The reaction temperature was then raised to and held at 155° C. for 3 hours. Residual water was removed in vacuo to afford 277.6 g of product.

EXAMPLE 10

Succinimide from Terpolymer of Example 4

A 4 L resin kettle equipped with overhead stirrer, Dean Stark trap, and thermometer was charged with 653.0 g of terpolymer of Example 4 (Acid # 0.75 meq KOH/g) and 889.0 g of process oil. The mixture was heated to 115° C. with stirring under a continual nitrogen purge. A polyethylene amine mixture comparable to tetraethylenepentamine, (Dow® S 1107), 60.40 g, was added to the above mixture over about 10 to 15 minutes. The reaction temperature was then raised to and held at 155° C. for 3 hours. Residual water was removed in vacuo to afford 1591.3 g of product.

EXAMPLE 11

Succinimide from Terpolymer of Example 5

A 500 ml resin kettle equipped with overhead stirrer, Dean Stark trap, and thermometer was charged with 90.32 g of terpolymer of Example 5 (Acid # 1.44 meq KOH/g) and 133.57 g of process oil. The mixture was heated to 115° C. with stirring under a continual nitrogen purge. A polyethylene amine mixture comparable to tetraethylenepentamine, (Dow® S 1107), 16.14 g, was added to the above mixture over about 10 minutes. The reaction temperature was then raised to and held at 155° C. for 3 hours. Residual water was removed in vacuo to afford 233.5 g of product.

EXAMPLE 12

Succinimide from Terpolymer of Example 6

A 1 L resin kettle equipped with overhead stirrer, Dean Stark trap, and thermometer was charged with 100.57 g of terpolymer of Example 6 (Acid # 1.16 meq KOH/g) and 144.23 g of process oil. The mixture was heated to 115° C. with stirring under a continual nitrogen purge. A polyethylene amine mixture comparable to tetraethylenepentamine, (Dow® S 1107), 14.30 g, was added to the above mixture over about 10 minutes. The reaction temperature was then raised to and held at 155° C. for 3 hours. Residual water was removed in vacuo to afford 257.6 g of product.

EXAMPLE 13

Succinimide from Terpolymer of Example 3

A 1 L resin kettle equipped with overhead stirrer, Dean Stark trap, and thermometer was charged with 106.50 g of terpolymer of Example 3 (Acid # 1.38 meq KOH/g) and 156.42 g of process oil. The mixture was heated to 115° C. with stirring under a continual nitrogen purge. The polyamine, tetraethylenepentamine, (Dow® S 1107), 18.31 g, was added to the above mixture over about 10 minutes. The reaction temperature was then raised to and held at 155° C. for 3 hours. Residual water was removed in vacuo to afford 276.7 g of product.

EXAMPLE 14

Succinimide from Terpolymer of Example 2

A 250 ml flask equipped with overhead stirrer, Dean Stark trap, and thermometer was charged with 25.00 g of the terpolymer of Example 2 (Acid #0.36 meq KOH/g) and 7.12 g of process oil. The mixture was heated to 115° C. with stirring under a continual nitrogen purge. A polyethylene amine mixture comparable to tetraethylenepentamine, (Dow® S 1 107), 1.13 g, was added to the above mixture over about 10 minutes. The reaction temperature was then raised to and held at 155° C. for 3 hours. Residual water was removed in vacuo to afford 32.05 g of product.

PERFORMANCE EVALUATIONS

Spot Dispersancy Test

The amine functionalized polymeric additives of this invention have comparable dispersancy performance in the Spot Dispersancy Test to a commercial Mannich dispersant (HiTEC® 7049 of the Ethyl Corporation of Richmond, Va.), hereinafter "Commercial 1", and a commercial succinimide dispersant (HiTEC® 646 of the Ethyl Corporation of Richmond, Va.), hereinafter "Commercial 2". The Spot Dispersancy Test affords a measure of an additive's ability to disperse sludge. In the Spot Dispersancy Test, 6% by weight based on the sludge oil of a dispersant candidate is mixed with an amount of Sequence VE sludge oil and is incubated at 300° F. for 16 hours. The resulting mixture (3–10 drops) is dropped onto a standard white blotter paper producing a sludge oil spot. After 24 hours, the diameter of the sludge and the oil rings are measured. As dispersancy is the ability of an oil to keep sludge in suspension, dispersancy in the Spot Dispersancy Test is reflected by the difference in diameters of the sludge and oil rings. High dispersancy is reflected by the sludge ring being nearly as wide as the oil ring. A rating (SDT Rating) is produced by multiplying the quotient of the sludge ring and the oil ring diameters by 100. A high numerical rating is indicative of good dispersancy. Table 1 depicts the Spot Dispersancy Test performance of several additives of the present invention. Commercial dispersant 1 refers to the commercial Mannich dispersant HiTEC® 7049 and Commercial dispersant 2 refers to the commercial succinimide dispersant HiTEC® 646.

TABLE 1

TERPOLYMER/Amine Dispersants
Spot Dispersant Test Results

| Sample | SDT Rating |
| --- | --- |
| Commercial 1 | 75.6 |
| Commercial 2 | 73.8 |
| Example 8 | 80 |
| Example 9 | 68.7 |
| Example 10 | 74.4 |
| Example 11 | 85.7 |
| Example 12 | 78.4 |

TABLE 1-continued

TERPOLYMER/Amine Dispersants
Spot Dispersant Test Results

| Sample | SDT Rating |
| --- | --- |
| Example 13 | 76.9 |
| Example 14 | 74.2 |
| No Dispersant | 34 |

A Spot Dispersancy Test Rating above 70 with 5 or 6 wt. % added dispersant is indicative of good dispersancy. The test procedure is described in Example 1 of U.S. Pat. No. 4,908,145. The Commercial dispersants 1 and 2 afforded respective SDT ratings of 75.6 & 73.8. These commercial products exhibit excellent dispersancy in gasoline engine test performance (Sequence VE and Sequence IIIE) and excellent diesel engine test performance. As indicated in Table 1, the dispersants of this invention likewise afford excellent dispersancy.

Viscosity Index Credit

Additives of this invention, Commercial 1, and Commercial 2 were blended into a motor oil formulation utilizing metal-containing sulfonates, zinc dithiophosphate wear inhibitors, sulfur containing antioxidants, a pour point depressant, and a viscosity index improver supplied by Shell Chemical Company (Shellvis® 300). Additives of the invention and the commercial Mannich dispersant were of nearly equal activities (around 40 wt. %), while the commercial succinimide dispersant was at a higher activity of 65 wt. %.

The dispersants of this invention impart significant 100° C. viscosity lift to finished oils with no adverse effects on low temperature viscometrics. The dispersants of this invention were blended into motor oils formulations utilizing metal-containing sulfonates, zinc dithiophosphate wear inhibitors, sulfur containing antioxidants, a pour point depressant, and a viscosity index improver supplied by Shell Chemical Company (Shellvis® 300). Blends with 7 wt. % dispersant and 7 wt. % viscosity index improver easily meet the 5W-30 low temperature −25° C. cold crank simulator specification of less than 3500 centipoise (cP).

The additives of this invention also contribute significant viscosity index credit to finished oils, reducing the amount of conventional viscosity index improver required to achieve a desired viscosity target. Reducing the amount of viscosity index improver in a motor oil can thus offer both cost and engine cleanliness advantages. Table 2 details viscosity index credit advantages exhibited by several polymeric dispersants of this invention. For oils formulated as described above, 7 wt. % of the Commercial dispersant 1 or Commercial dispersant 2 required 7 wt. % of the viscosity index improver (Shellvis® 300) to meet a viscosity target of 10.0 - to 10.6 cSt (centistokes). On the other hand, the polymeric dispersants additives of the invention require lower amounts of this same viscosity index improver to meet or exceed the 100° C. viscosity target.

TABLE 2

TERPOLYMER/Amine Dispersants
VISCOSITY INDEX CREDIT

| SAMPLE | DISPERSANT Wt. % | VII* Wt. % | 100° C. VISCOSITY (cSt) | −25° C. COLD CRANK (cP) |
| --- | --- | --- | --- | --- |
| Commercial 1 | 7.0 | 7.0 | 10.59 | 3,300 |
| Commercial 2 | 7.0 | 7.0 | 10.33 | 3,920 |
| Example 8 | 7.0 | 6.0 | 10.19 | 3,070 |
| Example 9 | 7.0 | 5.1 | 9.87 | 3,340 |

TABLE 2-continued

TERPOLYMER/Amine Dispersants
VISCOSITY INDEX CREDIT

| SAMPLE | DISPERSANT Wt. % | VII* Wt. % | 100° C. VISCOSITY (cSt) | −25° C. COLD CRANK (cP) |
| --- | --- | --- | --- | --- |
| Example 10 | 7.0 | 5.5 | 10.55 | 3,300 |
| Example 11 | 7.0 | 5.3 | 11.05 | 3,160 |
| Example 12 | 7.0 | 6.7 | 11.25 | 3,250 |
| Example 14 | 7.0 | 5.5 | 10.06 | 3,390 |

*Viscosity Index Improver

Oxidative Stability

The ability of the dispersants of this invention to resist oxidative thickening and to disperse engine sludge was measured in a oxidative thickening bench test. In this test the dispersant is oxidatively stressed in the presence of a severely used oil from a Sequence VE engine test. This used oil is viscous and serves as a source of engine sludge. The oil formulated with the test dispersant is heat at 320° F. with the introduction of air throughout the test duration of 168 hours. Samples were taken at regular intervals throughout the test and were monitored for viscosity increase and spot dispersancy. Lower viscosity increases indicate a better resistance to oxidative thickening. Ten drops of the stressed oil were dropped onto Whatman No. 3031915 blotter paper for spot dispersancy evaluation. After 16 hours, the diameters of the inner ring of dispersancy and the outer oil ring were measured. The percent spot dispersancy is the diameter of the inner ring, divided by the diameter of the outer ring, times 100. Spot dispersancy values above 70% are indicative of good dispersancy. Without dispersant, values of 34 to 38% are typically obtained. This test procedure is described in Example 1 of U.S. Pat. No. 4,908,145.

The Commercial dispersant 1 (HiTEC® 7049) was blended into a motor oil formulation utilizing metal-containing sulfonates, zinc dithiophosphate wear inhibitors, sulfur containing antioxidants, a pour point depressant, and a viscosity index improver supplied by Shell Chemical Company (Shellvis® 300) at 7 wt. % and gave a 165.7 percent viscosity increase and a spot dispersancy of 75.6% in the oil thickening bench test. This commercial dispersant exhibits excellent properties in the Sequence VE test and the Sequence IIE test. The inventive dispersant of Example 14 blended at 7 wt. % into the same formulation as above gave only a 45.4 percent viscosity increase and a spot dispersancy of 76.3%. These results demonstrate that the dispersants of this invention achieve both excellent oxidative stability and dispersancy. Oil Thickening Test results for several polymeric dispersants are set forth in Table 3.

TABLE 3

TERPOLYMER/Amine Dispersants
OXIDATIVE STABILITY & DISPERSANCY
(OIL THICKENING TEST)

| SAMPLE | VISCOSITY INCREASE @ 168 HOURS | SDT RATING |
| --- | --- | --- |
| Commercial 1 | 165.7 | 75.6 |
| Example 7 | 101.5 | 82.6 |
| Example 10 | 95.9 | 82.1 |
| Example 11 | 119.3 | 84.2 |
| Example 14 | 45.4 | 76.3 |

Fuel Economy

The ability of the dispersants of this invention to enhance the fuel economy of a finished motor oil was measured in a fuel economy bench test. The bench test enables one to predict fuel economy in actual engine tests. The Commercial dispersant 1 (HiTEC® 7049) was blended into a motor oil formulation utilizing metal-containing sulfonates, zinc dithiophosphate wear inhibitors, antioxidants, a pour point depressant, and a viscosity index improver supplied by Shell Chemical Company (Shellvis® 300) at 7 wt. %. This formulation affords marginal Sequence VI-A engine test performance (1.07% enhanced fuel efficiency increase). To pass the enhanced fuel efficiency increase test, the rating should be at least 1.1%. The dispersants of this invention gave improved predicted enhanced fuel efficiency increases greater than the commercial dispersant. These results indicate the dispersants of this invention offer valuable fuel economy benefits to finished crankcase oils. Table 4 sets forth the fuel economy benefits of other embodiments of this invention.

TABLE 4

TERPOLYMER/AMINE DISPERSANTS
FUEL ECONOMY BENCH TEST RESULTS
5W30 OILS

| SAMPLE | DISPERSANT Wt. % | EFEI* (Predicted) |
|---|---|---|
| Commercial 1 | 7.0 | 1.07 |
| Example 7 | 7.0 | 1.18 |
| Example 10 | 7.0 | 1.09 |
| Example 11 | 7.0 | 1.14 |

*enhanced fuel efficiency increase

Sequence VE Engine Test Evaluation

A polymeric dispersant of this invention prepared as in Example 10 was blended into a motor oil formulation utilizing metal-containing sulfonates, zinc dithiophosphate wear inhibitors, sulfur containing antioxidants, a pour point depressant, and a viscosity index improver supplied by Shell Chemical Company (Shellvis® 300). The dispersant of the present invention from Example 10 was tested at a treat rate sufficient to satisfy the stringent "SH" specifications. The resulting formulation was evaluated in the Sequence VE engine test (ASTM Test Method D5302) which measures dispersancy and wear protection in simulated severe field service characterized by "stop and go" city driving and moderate motorway operation. The "VE" measures dispersancy by rating average engine sludge (AES), average engine varnish (AEV) on a scale of 1 to 10, 10 being the best. The Sequence VE engine test results are given in Table 5.

TABLE 5

TERPOLYMER/AMINE DISPERSANTS
Sequence VE Engine Test Results
5W30 OILS

| Feature | Rating | Passing |
|---|---|---|
| Rocker Arm Cover Sludge | 9.05 | 7.0 |
| Average Engine Sludge | 9.24 | 9.0 |
| Average Engine Varnish | 5.33 | 5.0 |
| Piston Skirt Varnish | 7.55 | 6.5 |
| Average Camshaft Wear, mills | 0.93 | 5.0 |
| Maximum Camshaft Wear, mills | 1.23 | 15.0 |

As can be seen from the sequence VE engine test results, the lubricating composition of the present invention comprising the polymeric dispersant provided excellent sludge and varnish cleanliness and wear protection, passing all test parameters.

Industrial Applicability

Dispersants are required in today's lubricating compositions since increasing demands are being placed on the lubricant by today's internal combustion engines. The need for effective dispersants has also increased as the amount of "stop and go" driving has increased on today's crowded highways. Therefore there is an ever increasing need to provide lubricant and fuel additives of enhanced performance.

The terpolymers of the present invention and their derivatives impart superior sludge protection and improved viscometrics to lubricant oils. Thus, the polymeric additives of this invention permit lower dispersant treatment rates as well as allowing for incorporation of lower levels of viscosity index improving agents.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, including the equivalents thereof available as a matter of law.

We claim:

1. An oil soluble dispersant additive useful in oleaginous compositions comprising a product prepared by contacting (i) a terpolymer comprising an unsaturated acidic reactant, a high molecular weight olefin, and a di-or poly-unsaturated compound, said unsaturated acidic reactant comprising at least one unsaturated $C_4$ to $C_{10}$ carboxylic acid or anhydride, or acid derivative, said high molecular weight olefin is derived from the oligomerization or polymerization of at least one $C_2$ to $C_{10}$ alpha olefin monomer, wherein at least 50% of the high molecular weight olefin has polymer chains containing terminal vinylidene unsaturation, and wherein the high molecular weight olefin has a number average molecular weight from about 300 to 6,000 with (ii) at least one nucleophilic reagent selected from the group consisting of amines, alcohols, metal reactants and mixtures thereof under conditions effective to form adducts of the nucleophilic reagent with the terpolymer.

2. The dispersant additive according to claim 1 wherein the nucleophilic reagent is a polyalkylene polyamine containing 3 to 6 primary amino groups per molecule.

3. The dispersant additive according to claim 2 wherein the unsaturated acidic reactant is maleic acid or anhydride, the high molecular weight olefin is polybutene, and the di- or poly- unsaturated compound is diallylformamide.

4. The dispersant additive according to claim 2 wherein the unsaturated acidic reactant is maleic acid or anhydride, the high molecular weight olefin is polybutene, and the di- or poly- unsaturated compound is 1,9-decadiene.

5. The dispersant additive according to claim 2 wherein the unsaturated acidic reactant is maleic acid or anhydride, the high molecular weight olefin is polybutene, and the di- or poly- unsaturated compound is divinylbenzene.

6. The dispersant additive according to claim 2 wherein the polyamine is tetraethylenepentamine, or a mixture of polyamines having an average composition which approximates tetraethylenepentamine.

7. The dispersant additive according to claim 3 wherein the polyamine is tetraethylenepentamine, or a mixture of polyamines having an average composition which approximates tetraethylenepentamine.

8. The dispersant additive according to claim 4 wherein the polyamine is tetraethylenepentamine, or a mixture of polyamines having an average composition which approximates tetraethylenepentamine.

9. The dispersant additive according to claim 5 wherein the polyamine is tetraethylenepentamine, or a mixture of polyamines having an average composition which approximates tetraethylenepentamine.

10. The dispersant additive according to claim 2 wherein the nucleophilic reagent is an N-substituted poly(hydroxyalkyl)amine or a mixture of a polyamine and a polyol.

11. The dispersant additive according to claim 10 wherein the unsaturated acidic reactant is maleic acid or anhydride, the high molecular weight olefin is polybutene, and the di- or poly- unsaturated compound is selected from diallylformamide, 1,9-decadiene or divinylbenzene.

12. The dispersant additive according to claim 2 wherein the nucleophilic reagent is a basic salt of aminoguanidine.

13. The dispersant additive according to claim 12 wherein the unsaturated acidic reactant is maleic acid or anhydride, the high molecular weight olefin is polybutene, and the di- or poly- unsaturated compound is selected from diallylformamide, 1,9-decadiene or divinylbenzene.

14. A method of dispersing contaminants in an oil of lubricating viscosity, said method comprising adding to said oil an additive comprising an oil soluble dispersant according to claim 1.

* * * * *